(12) United States Patent
Lee et al.

(10) Patent No.: US 12,006,392 B2
(45) Date of Patent: Jun. 11, 2024

(54) POST-PROCESSING APPARATUS

(71) Applicant: LG CHEM, LTD., Seoul (KR)

(72) Inventors: Se Woong Lee, Daejeon (KR); Young Man Song, Daejeon (KR); Hyeong Joon Kim, Daejeon (KR); Hyun Min Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/775,834

(22) PCT Filed: Apr. 16, 2021

(86) PCT No.: PCT/KR2021/004804
§ 371 (c)(1),
(2) Date: May 10, 2022

(87) PCT Pub. No.: WO2021/215750
PCT Pub. Date: Oct. 28, 2021

(65) Prior Publication Data
US 2022/0387960 A1 Dec. 8, 2022

(30) Foreign Application Priority Data

Apr. 24, 2020 (KR) .................. 10-2020-0050155

(51) Int. Cl.
*C08F 6/00* (2006.01)
*B01D 19/00* (2006.01)
(Continued)

(52) U.S. Cl.
CPC .......... *C08F 6/001* (2013.01); *B01D 19/0078* (2013.01); *B01D 19/04* (2013.01);
(Continued)

(58) Field of Classification Search
None
See application file for complete search history.

(56) References Cited

U.S. PATENT DOCUMENTS

| 984,754 | A | * | 2/1911 | Eijdman | ................. | B01D 1/06 |
| | | | | | | 159/26.1 |
| 1,033,558 | A | * | 7/1912 | Dunn | ....................... | B01D 1/26 |
| | | | | | | 165/113 |

(Continued)

FOREIGN PATENT DOCUMENTS

| CN | 1112938 A | 12/1995 |
| CN | 1310726 A | 8/2001 |

(Continued)

OTHER PUBLICATIONS

Extended European Search Report issued in corresponding European Patent Application No. 21792251.7 dated Dec. 12, 2022.
(Continued)

*Primary Examiner* — Jennifer A Leung
(74) *Attorney, Agent, or Firm* — Morgan, Lewis & Bockius LLP

(57) ABSTRACT

The present invention relates to a post-processing apparatus configured to post-process latex, the post-processing apparatus including: a receiving tank having therein a receiving part and having an inlet port through which the latex is introduced into the receiving part and a discharge port through which the latex is discharged; an ultrasonic wave generating device configured to generate ultrasonic waves to the latex accommodated in the receiving tank; a pressure reducing part configured to reduce a pressure of the receiving part of the receiving tank to discharge an unreacted monomer to the outside of the receiving tank; and a partition part provided in the receiving part of the receiving tank and comprising a plurality of partitions disposed in a direction from the inlet port toward the discharge port of the receiving tank, in which the latex accommodated in the receiving part moves along upper and lower sides of the plurality of partitions.

19 Claims, 2 Drawing Sheets

(51) Int. Cl.
*B01D 19/04* (2006.01)
*B01J 19/00* (2006.01)
*B01J 19/10* (2006.01)
*C08F 14/06* (2006.01)

(52) U.S. Cl.
CPC ......... *B01J 19/0013* (2013.01); *B01J 19/006* (2013.01); *B01J 19/10* (2013.01); *C08F 14/06* (2013.01); *B01J 2219/00159* (2013.01); *B01J 2219/0025* (2013.01); *B01J 2219/00768* (2013.01)

(56) References Cited

U.S. PATENT DOCUMENTS

| | | | | |
|---|---|---|---|---|
| 3,229,448 A | * | 1/1966 | Jacke | B08B 3/12 |
| | | | | 96/175 |
| 3,239,998 A | * | 3/1966 | Carter | B01D 19/0078 |
| | | | | 96/175 |
| 3,713,274 A | * | 1/1973 | Sauer | B01D 19/0042 |
| | | | | 96/174 |
| 4,008,361 A | | 2/1977 | Park et al. | |
| 4,117,220 A | | 9/1978 | Worman, Jr. | |
| 4,375,541 A | * | 3/1983 | Wei | C08F 6/003 |
| | | | | 528/502 R |
| 4,907,611 A | * | 3/1990 | Shibano | B01D 19/0078 |
| | | | | 134/108 |
| 5,322,082 A | * | 6/1994 | Shibano | B08B 3/12 |
| | | | | 96/198 |
| 5,389,264 A | * | 2/1995 | Lehmann | B01D 19/0036 |
| | | | | 96/194 |
| 5,929,206 A | | 7/1999 | Bindelle | |
| 6,288,211 B1 | | 9/2001 | Yoshida et al. | |
| 6,375,793 B1 | | 4/2002 | Uchida et al. | |
| 2006/0011560 A1 | * | 1/2006 | Ruech | C02F 1/006 |
| | | | | 210/761 |
| 2014/0088222 A1 | | 3/2014 | Ueda et al. | |
| 2020/0230567 A1 | | 7/2020 | Suzuki et al. | |

FOREIGN PATENT DOCUMENTS

| | | | | |
|---|---|---|---|---|
| CN | 203697492 U | | 7/2014 | |
| CN | 107141386 A | | 9/2017 | |
| CN | 104231173 B | | 8/2018 | |
| CN | 109952340 A | | 6/2019 | |
| CN | 210030668 U | | 2/2020 | |
| DE | 3736578 A | * | 5/1989 | ............ B01D 19/02 |
| EP | 0668134 A2 | | 8/1995 | |
| EP | 1097947 A1 | | 9/2001 | |
| EP | 3514196 A1 | | 7/2019 | |
| JP | H05-255424 A | | 10/1993 | |
| JP | H06-049806 U | | 7/1994 | |
| JP | H07-188326 A | | 7/1995 | |
| JP | 2000-086704 A | | 3/2000 | |
| JP | 2000-098534 A | | 4/2000 | |
| JP | 2000-273104 A | | 10/2000 | |
| JP | 2000-309657 A | | 11/2000 | |
| JP | 2003-010603 A | | 1/2003 | |
| JP | 2003-048917 A | | 2/2003 | |
| JP | 2008-200636 A | | 9/2008 | |
| JP | 2016043434 A | * | 4/2016 | |
| KR | 10-2001-0050323 A | | 6/2001 | |
| KR | 10-2001-0053137 A | | 6/2001 | |
| KR | 10-2003-0042170 A | | 5/2003 | |
| KR | 10-2007-0047979 A | | 5/2007 | |
| KR | 10-0789234 B1 | | 1/2008 | |
| KR | 10-1869373 B1 | | 6/2018 | |
| KR | 10-2019-0041969 A | | 4/2019 | |
| SU | 262382 A1 | | 1/1970 | |
| WO | WO-2015036523 A1 | * | 3/2015 | ............ B01D 19/02 |
| WO | WO2019/069349 A1 | | 10/2020 | |

OTHER PUBLICATIONS

International Search Report (with partial translation) and Written Opinion dated Jul. 21, 2021, for corresponding International Patent Application No. PCT/KR2021/004804.
Office Action issued Nov. 29, 2023 for Chinese Patent Application No. 202180006456.7.
Office Action issued in corresponding Russian patent application 2022112852/05(026718) dated Feb. 29, 2024.

* cited by examiner

POST-PROCESSING APPARATUS

TECHNICAL FIELD

Cross-Reference to Related Application

This application claims priority to and the benefit of Korean Patent Application No. 10-2020-0050155 filed in the Korean Intellectual Property Office on Apr. 24, 2020, the entire contents of which are incorporated herein by reference.

TECHNICAL FIELD

The present invention relates to a post-processing apparatus.

BACKGROUND ART

During a process of polymerizing PVC using vinyl chloride monomers, a rate of conversion of the monomers decreases as a polymerization conversion ratio becomes closer to 100%. Therefore, when the conversion ratio reaches a predetermined conversion ratio, the polymerization is ended, unreacted monomers are recovered, and then polymers are obtained. Legal regulations on the number of unreacted monomers contained in a product and an environmental problem of unreacted monomers discharged during a drying process are strengthened. For this reason, the unreacted monomers need to be managed and minimized.

In general, there have been used a method of recovering unreacted monomers from polymers by raising a temperature and/or reducing a pressure in a reactor after polymerization and a method of recovering unreacted monomers by conveying completely polymerized polymers to another tank under a raised-temperature and/or reduced-pressure condition. However, these methods have poor efficiency in recovering the unreacted monomers. In addition, a method of recovering unreacted monomers using steam has a problem in that thermal stability of latex deteriorates due to a high temperature, which adversely affects physical properties of a final product.

[Document of Related Art] (Patent Document 1) Korean Patent Laid-Open No. 10-2001-0050323

DISCLOSURE

Technical Problem

An object of the present invention is to provide a post-processing apparatus capable of removing an unreacted monomer with high efficiency without impairing thermal stability of latex.

Technical Solution

A post-processing apparatus according to an embodiment of the present invention is configured to post-process latex and includes: a receiving tank having therein a receiving part and having an inlet port through which the latex is introduced into the receiving part and a discharge port through which the latex is discharged; an ultrasonic wave generating device configured to generate ultrasonic waves to the latex accommodated in the receiving tank; a pressure reducing part configured to reduce a pressure of the receiving part of the receiving tank to discharge an unreacted monomer to the outside of the receiving tank; and a partition part provided in the receiving part of the receiving tank and including a plurality of partitions disposed in a direction from the inlet port toward the discharge port of the receiving tank, in which the latex accommodated in the receiving part moves along upper and lower sides of the plurality of partitions.

Advantageous Effects

According to the present invention, it is possible to remove the unreacted residual monomer with high efficiency without impairing thermal stability of the latex by applying the ultrasonic waves to the latex by the ultrasonic wave generating device, increasing the contact area of the latex by the partition part, and reducing the pressure by the pressure reducing part.

In addition, it is possible to improve the efficiency in removing the unreacted monomer and prevent deterioration in color of the latex by adjusting the residence time of the latex in the receiving tank by controlling the discharge valve for discharging the latex by the control part based on the measured value of the height level of the latex.

MODE FOR INVENTION

Figure 1:
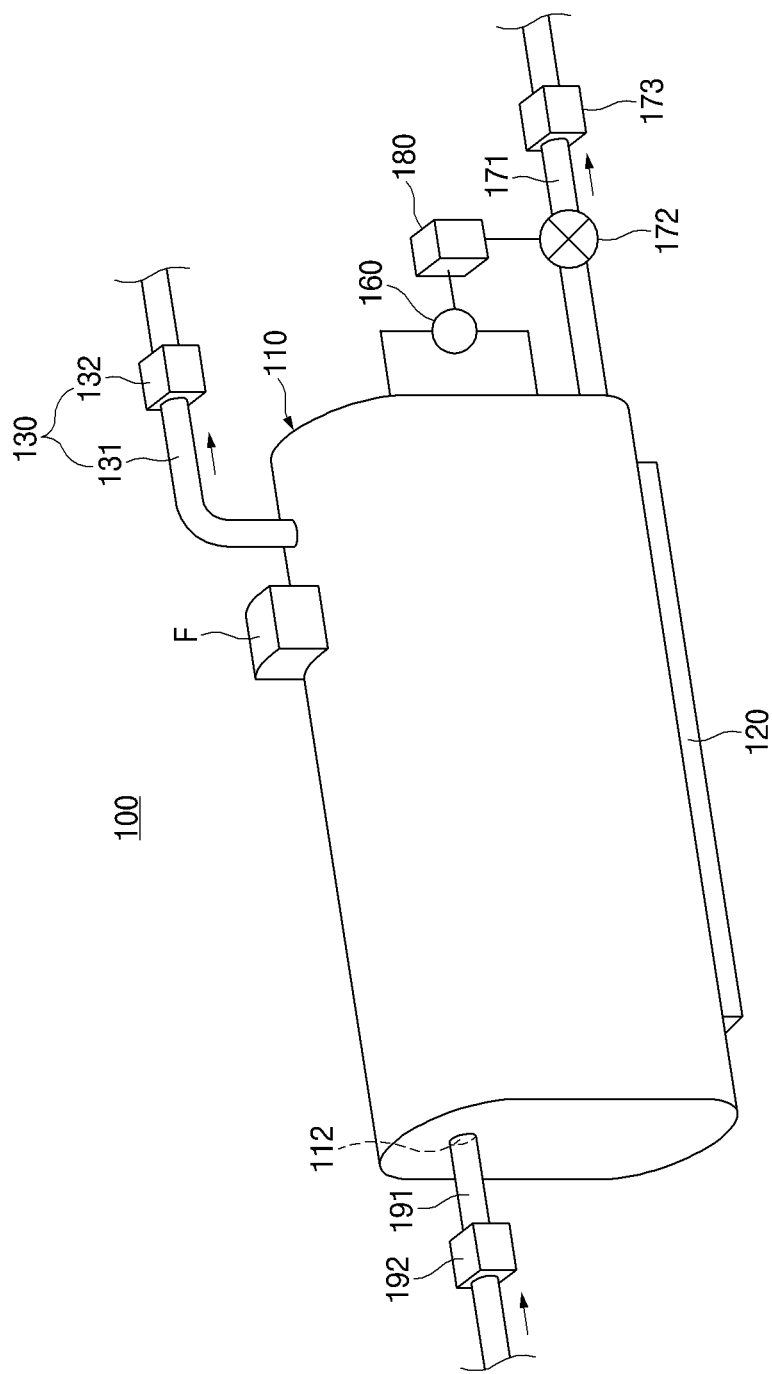
FIG. 1 is a perspective view exemplarily illustrating a post-processing apparatus according to an embodiment of the present invention.

Other objects, particular advantages, and novel features of the present invention will be more clearly understood from the following detailed description and the exemplary embodiments with reference to the accompanying drawings. In giving reference numerals to constituent elements of the respective drawings in the present specification, it should be noted that the same constituent elements will be designated by the same reference numerals, if possible, even though the constituent elements are illustrated in different drawings. In addition, the present invention may be implemented in various different ways, and is not limited to the embodiments described herein. Further, in the description of the present invention, the specific descriptions of well-known related technologies will be omitted when it is determined that the specific descriptions may unnecessarily obscure the subject matter of the present invention.

Figure 2:
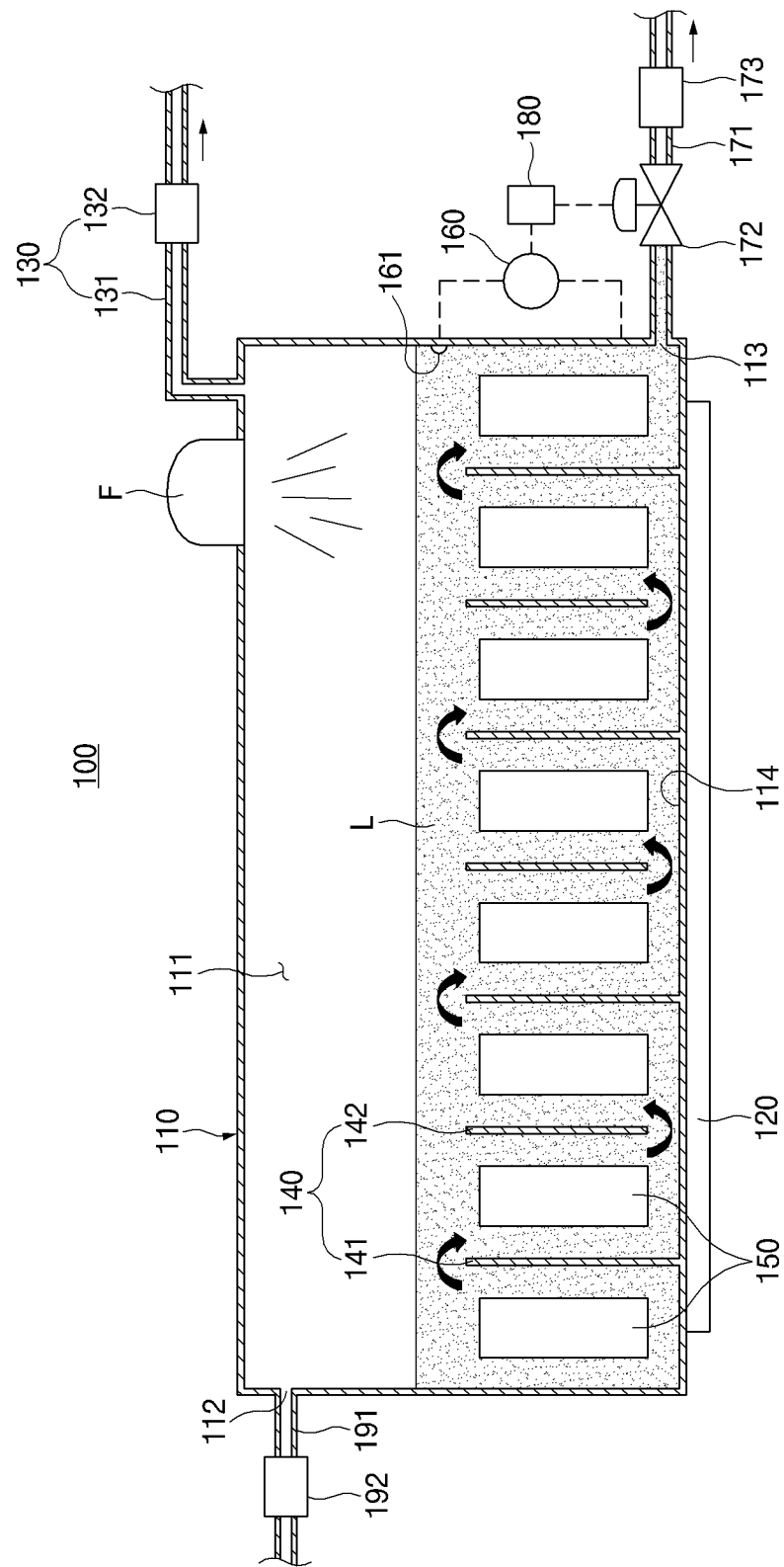
FIG. 2 is a cross-sectional view illustrating a concept of the post-processing apparatus according to the embodiment of the present invention.

FIG. 1 is a perspective view exemplarily illustrating a post-processing apparatus according to an embodiment of the present invention, and FIG. 2 is a cross-sectional view illustrating a concept of the post-processing apparatus according to the embodiment of the present invention.

Referring to FIGS. 1 and 2, a post-processing apparatus 100 according to the embodiment of the present invention includes a receiving tank 110 having a receiving part 111 into which latex L is introduced, an ultrasonic wave generating device 120 configured to generate ultrasonic waves to the latex L, a pressure reducing part 130 configured to reduce a pressure of the receiving part 111 of the receiving tank 110, and a partition part 140 provided in the receiving part 111 of the receiving tank 110 and including a plurality of partitions disposed in a direction from an inlet port 112 toward a discharge port 113 of the receiving tank 110.

In addition, the post-processing apparatus 100 according to the embodiment of the present invention may further include a foam breaker part F configured to remove foam generated by a flow of the latex, temperature adjusting parts 150 configured to adjust a temperature of the latex L, a level indicator 160 configured to measure a height level of the latex L, and a control part 180.

Further, the post-processing apparatus 100 according to the embodiment of the present invention may further include a latex L discharge valve 172 disposed at a side of the discharge port 113 of the receiving tank 110, a discharge line 171 connected to the discharge valve 172, and a discharge pump 173 provided in the discharge line 171.

In more detail, the post-processing apparatus 100 according to the embodiment of the present invention is the post-processing apparatus 100 that post-processes the latex L and separates and removes unreacted monomer.

In this case, the latex L may be vinyl chloride-based copolymer latex L. In this case, the vinyl chloride-based copolymer may be polyvinyl chloride.

The receiving tank 110 may have therein the receiving part 111 and have an inlet port 112 through which the latex L is introduced into the receiving part 111 and a discharge port 113 through which the latex L is discharged.

The inlet port 112 may be provided at one side of the receiving tank 110, and the discharge port 113 may be provided at the other side of the receiving tank 110. In this case, the inlet port 112 may be provided at an upper lateral side of the receiving tank 110, and the discharge port 113 may be provided at a lower lateral side of the receiving tank 110.

In addition, a volume of the receiving tank 110 may be 15 m3.

The ultrasonic wave generating device 120 may generate the ultrasonic waves to the latex L accommodated in the receiving tank 110 and separate the unreacted monomer from the latex L. Therefore, it is possible to improve efficiency in removing the unreacted (residual) monomer.

In addition, the ultrasonic wave generating device 120 may be provided at a lower side of the receiving tank 110 and may generate the ultrasonic waves to the latex L accommodated in the receiving tank 110. In this case, when the ultrasonic waves are generated by the ultrasonic wave generating device 120, the ultrasonic waves propagate through a solution (latex), and cavitation occurs, such that fine low-pressure cavities are generated. The cavities are created and eliminated repeatedly within a very short time, and the number of cavities, the size of the cavities, and the momentum of the cavities are changed depending on frequencies of the generated ultrasonic waves, a temperature and a pressure of the solution, and the like. The cavities are accompanied by a rapid change in pressure while being generated and eliminated, and the residual unreacted monomer may be separated from the polymer (latex) by the cavities which are created and eliminated in the vicinity of a stripping target.

Further, the ultrasonic wave generating device 120 may generate the ultrasonic wave with a frequency of 75 to 1,500 kHz, for example. In this case, specifically, the ultrasonic wave generating device 120 may generate the ultrasonic wave with a frequency of 100 to 1,000 kHz, for example. In this case, when the ultrasonic wave generating device 120 generates the ultrasonic wave with a frequency of 100 kHz or more, it is possible to significantly improve efficiency in removing the unreacted monomer.

The pressure reducing part 130 may discharge the unreacted monomer to the outside of the receiving tank 110 by reducing a pressure of the receiving part 111 of the receiving tank 110.

In addition, the pressure reducing part 130 may include a pressure reducing line 131 connected to an upper side of the receiving tank 110, and a vacuum pump 132 provided in the pressure reducing line 131.

Further, the vacuum pump 132 of the pressure reducing part 130 may reduce the pressure of the receiving part 111 of the receiving tank 110 and thus remove and discharge the unreacted monomer, which is evaporated and separated from the latex L by the ultrasonic wave generating device 120, to the outside of the receiving tank 110 through the pressure reducing line 131.

In this case, when the pressure of the receiving part 111 of the receiving tank 110 is reduced by applying a vacuum pressure to the receiving part 111 through the pressure reducing line 131 by the vacuum pump 132, the evaporated, separated unreacted monomer positioned in the receiving part 111 of the receiving tank 110 may be easily discharged. In this case, when the pressure of the receiving part 111 of the receiving tank 110 is reduced by the pressure reducing part 130, a boiling point of a volatile unreacted monomer is decreased, such that the volatile unreacted monomer may be more easily separated even without a separate carrier gas.

Meanwhile, the vacuum pump 132 of the pressure reducing part 130 may apply the vacuum pressure of −0.5 to −0.7 kg/cm2.

The partition part 140 may be provided in the receiving part 111 of the receiving tank 110 and may include the plurality of partitions disposed in the direction from the inlet port 112 toward the discharge port 113 of the receiving tank 110. In this case, the latex L accommodated in the receiving part 111 may move along upper and lower sides of the plurality of partitions.

In addition, the partition part 140 may include lower partitions 141 fixed to a bottom surface 114 of the receiving tank 110, and upper partitions 142 positioned to be spaced apart upward from the bottom surface 114 of the receiving tank 110 at a predetermined interval. In this case, the latex L accommodated in the receiving part 111 may move along upper sides of the lower partitions 141 and lower sides of the upper partitions 142. In this case, each of the lower partition 141 and the upper partition 142 may be provided in the form of a plate, and two opposite portions of each of the lower partition 141 and the upper partition 142 may be fixed to inner walls of two opposite sides of the receiving tank 110.

Meanwhile, the lower partitions 141 and the upper partition 142 may be alternately disposed in the direction from the inlet port 112 toward the discharge port 113 of the receiving tank 110.

Therefore, a surface area of the latex L may be increased as the latex L moves along the upper and lower sides of the lower partitions 141 and the upper partitions 142 disposed in the receiving part 111 of the receiving tank 110. That is, a contact area may be increased when the unreacted monomer is subjected to stripping by being sucked through the pressure reducing line 131 by the vacuum pressure applied by the pressure reducing part 130. Therefore, it is possible to significantly improve efficiency in removing the unreacted monomer.

Further, if there is no partition part 140, only a portion of the latex L positioned the upper side is directly affected by the vacuum pressure of the pressure reducing part 130 positioned at the upper side of the receiving tank 110 and a portion of the latex L positioned at the lower side is relatively less affected by the vacuum pressure when the latex L is introduced into the inlet port 112 and then discharged through the discharge port 113. However, when the latex L moves along the upper and lower sides, the latex L may be entirely and uniformly affected by the vacuum pressure.

In addition, if there is no partition part 140, the portion of the latex L positioned at the lower side is greatly affected by the ultrasonic waves from the ultrasonic wave generator positioned at the lower side of the receiving tank 110 when the latex L is introduced into the inlet port 112 and then discharged through the discharge port 113, but the portion of the latex L positioned at the upper side is relatively less affected by the ultrasonic waves. However, when the latex L moves along the upper and lower sides of the partition part 140, the latex L may be entirely and uniformly affected by the vacuum pressure.

The temperature adjusting parts 150 may be positioned in the receiving part 111 of the receiving tank 110 and may adjust a temperature of the latex L accommodated in the receiving part 111. Therefore, it is possible to improve efficiency in removing the unreacted (residual) monomer.

In addition, the temperature adjusting parts 150 may be disposed between the lower partitions 141 and the upper partitions 142 in the movement direction of the latex L. In this case, the temperature adjusting parts 150 may be disposed at front and rear sides of each of the lower partition 141 and the upper partition 142 in the movement direction of the latex L, respectively.

Further, the temperature adjusting part 150 may be configured as a heater.

Further, the temperature adjusting part 150 may maintain a temperature of the latex L accommodated in the receiving part 111 as 73 to 87° C., for example. In this case, specifically, the temperature adjusting part 150 may maintain the temperature of the latex L accommodated in the receiving part 111 as 75 to 85° C., for example. In this case, when the temperature adjusting part 150 maintains the temperature of the latex L accommodated in the receiving part 111 as 75° C. or more, the efficiency in removing the unreacted monomer may be significantly improved.

The foam breaker part F may be positioned at the upper side of the receiving tank 110 and may spray a foam removing substance to remove foam generated by the flow of the latex L in the receiving part 111.

Therefore, bubbles generated by the flow of the latex L are removed, such that the efficiency in removing the unreacted monomer from the latex L may be improved.

In this case, as a chemical substance, which is the foam removing substance, a substance, such as a natural-fat-oil antifoaming agent, a polyether-based antifoaming agent, a high-grade aliphatic alcohol-based antifoaming agent, a silicon-based antifoaming agent, a paraffin-based antifoaming agent, or a mineral oil-based antifoaming agent, which is applied as an antifoaming agent, may be applied without limitation. In this case, specifically, the chemical substance, which is the foam removing substance, may include aliphatic alcohol having a carbon number of 8 to 19. More specifically, the chemical substance may be at least one of aliphatic alcohol having a carbon number of 8 to 10, aliphatic alcohol having a carbon number of 12 to 18, and aliphatic alcohol having a carbon number of 16 to 18.

The discharge valve 172 may be provided at the side of the discharge port 113 of the receiving tank 110 and adjust the discharge of the latex L. In this case, a residence time of the latex L in the receiving tank 110 may be adjusted by operating the discharge valve 172. In this case, the discharge valve 172 may be positioned at the lower lateral side of the receiving tank 110.

The discharge line 171 may be connected to the discharge valve 172, and the discharge pump 173 may be provided in the discharge line 171. In this case, the discharge pump 173 may operate to discharge the latex L, which is accommodated in the receiving part 111 of the receiving tank 110, to the outside of the receiving tank 110 through the discharge line 171. In this case, the discharge pump 173 may be provided in the discharge line 171 so as to be farther from the receiving tank 110 than the discharge valve 172. Therefore, the discharge valve 172 may adjust the discharge amount of latex L even though the discharge pump 173 operates.

The level indicator 160 may measure a height level of the latex L. In this case, it is possible to adjust the residence time of the latex L in the receiving tank 110 by adjusting the discharge valve 172 based on the height level of the latex L measured by the level indicator 160.

In this case, the level indicator 160 may include a liquid level measuring sensor 161 provided at the lateral side of the receiving part 111 of the receiving tank 110 and configured to measure a height (level) of the accommodated liquid. Therefore, the level indicator 160 may measure the height level of the latex L accommodated in the receiving part 111.

The control part 180 may adjust an opening degree of the discharge valve 172 by being supplied with a measured level value of the latex L from the level indicator 160. In this case, when the control part 180 determines that the measured level value of the latex is smaller than a value stored in a memory (not illustrated), the control part 180 increases the discharge amount of the latex L by further opening the discharge valve 172. When the control part 180 determines that the measured level value of the latex is larger than the value stored in the memory, the control part 180 may adjust the residence time of the latex L in the receiving tank 110 by decreasing the discharge amount of latex L by further closing the discharge valve 172.

In addition, the control part 180 may maintain the residence time of the latex L in the receiving tank 110 as 13 to 32 minutes, for example. In this case, specifically, the control part 180 may maintain the residence time of the latex L in the receiving tank 110 as 15 to 25 minutes, for example.

In this case, it is possible to significantly improve the efficiency in removing the unreacted monomer by maintaining the residence time of the latex L in the receiving tank 110 as 15 minutes or more by the control part 180, and it is possible to effectively prevent deterioration in color of the latex L by maintaining the residence time as 25 minutes or less.

Meanwhile, the post-processing apparatus 100 according to the embodiment of the present invention may further include an inlet line 191 connected to the inlet port 112 of the receiving tank 110, and an inlet pump 192 provided in the inlet line 191.

In this case, the inlet pump 192 may operate to introduce the latex L into the receiving part 111 of the receiving tank 110 through the inlet line 191.

The post-processing apparatus 100 according to the embodiment of the present invention configured as described above may remove the unreacted residual monomer with high efficiency without impairing thermal stability of the latex L by applying the ultrasonic waves to the latex L by the ultrasonic wave generating device 120, increasing the contact area of the latex L by the partition part 140, reducing the pressure by the pressure reducing part 130, and maintaining the appropriate temperature of the latex L by the temperature adjusting part 150.

In addition, it is possible to improve the efficiency in removing the unreacted monomer and prevent deterioration in color of the latex L by measuring the height level of the latex L by the level indicator 160, controlling the opening degree of the discharge valve 172 for discharging the latex L by the control part 180 based on the measured value, and thus adjusting the residence time of the latex L in the receiving tank 110.

As a result, the post-processing apparatus 100 according to the embodiment of the present invention may reduce the unreacted (residual) monomer content of the latex L to 10 ppm or less and may satisfy a condition in which the color has a white index (WI) of 90 or more.

Example 1

Latex was inputted into the inlet port of the receiving tank having therein the receiving part and having a volume of 15 m3, the inputted latex moved along the upper and lower sides of the partition part including the plurality of upper partitions and the plurality of lower partitions disposed alternately, and the latex flowed toward the discharge port of the receiving tank.

In this case, a temperature of the latex was maintained as 80° C. by the temperature adjusting parts positioned between the upper partitions and the lower partitions, and the ultrasonic wave generating device positioned at the lower side of the receiving tank generated ultrasonic waves with a frequency of 300 kHz.

In addition, foam was removed by spraying the foam removing substance by the foam breaker part during the flow of the latex, and the residual unreacted monomer generated at this time was reduced in pressure and removed by the pressure reducing part.

Further, the level indicator measured a height level of the latex, and the control part adjusted the latex discharge valve, such that the residence time of the latex in the receiving tank was maintained as 20 minutes.

Example 2

A process identical to the process of Example 1 was performed except that the temperature of the latex was maintained as 75° C. by the temperature adjusting parts.

Example 3

A process identical to the process of Example 1 was performed except that the temperature of the latex was maintained as 85° C. by the temperature adjusting parts.

Example 4

A process identical to the process of Example 1 was performed except that the residence time of the latex in the receiving tank was maintained as 15 minutes by adjusting the discharge valve by the control part.

Example 5

A process identical to the process of Example 1 was performed except that the residence time of the latex in the receiving tank was maintained as 25 minutes by adjusting the discharge valve by the control part.

Example 6

A process identical to the process of Example 1 was performed except that the ultrasonic wave with a frequency of 100 kHz was generated by the ultrasonic wave generating device.

<Comparative Examples 1 to 5 (the cases in which the facility according to the present invention was not used)>

Comparative Example 1

Latex was inputted into a tank having a volume of 15m3 and agitated at 35 rpm, a temperature of a jacket was raised to 80° C., and stripping was performed for 20 minutes under a reduced pressure.

Comparative Example 2

Latex was inputted into a tank having a volume of 15m3 and agitated at 70 rpm, a temperature of a jacket was raised to 80° C., and stripping was performed for 20 minutes under a reduced pressure.

Comparative Example 3

Latex was inputted into a tank having a volume of 15m3 and agitated at 35 rpm, a temperature of a jacket was raised to 90° C., and stripping was performed for 20 minutes under a reduced pressure.

Comparative Example 4

Latex was inputted into a tank having a volume of 15m3 and agitated at 35 rpm, a temperature of a jacket was raised to 90° C., and stripping was performed for 40 minutes under a reduced pressure.

Comparative Example 5

Latex was inputted into a tank having a volume of 15m3 and agitated at 35 rpm, steam having a temperature of 120° C. was injected through a lower portion of the tank, and stripping was performed for 20 minutes under a reduced pressure.

<Comparative Examples 6 to 13 (the cases in which a part of the facility according to the present invention was used but a condition was insufficient.)>

Comparative Example 6

A process identical to the process of Example 1 was performed except that no ultrasonic wave was generated by the ultrasonic wave generating device.

Comparative Example 7

A process identical to the process of Example 1 was performed except that the ultrasonic wave with a frequency of 50 kHz was generated by the ultrasonic wave generating device and stripping was performed.

Comparative Example 8

A process identical to the process of Example 1 was performed except that no temperature adjusting part was used. In this case, a temperature of the latex was 40° C.

Comparative Example 9

A process identical to the process of Example 1 was performed except that the temperature of the latex was set to 70° C. and stripping was performed.

Comparative Example 10

A process identical to the process of Example 1 was performed except that the temperature of the latex was set to 90° C. and stripping was performed.

Comparative Example 11

A process identical to the process of Example 1 was performed except that the partition part was removed and stripping was performed.

Comparative Example 12

A process identical to the process of Example 1 was performed except that the residence time of the latex was set to 10 minutes and stripping was performed.

Comparative Example 13

A process identical to the process of Example 1 was performed except that the residence time of the latex was set to 30 minutes and stripping was performed.

Experimental Example 1

In order to measure the residual monomer content, VCM components, which are obtained in a condition of the latex of 2 g, 90° C., 20 minutes, and 20 mL vial, were analyzed using HS-GC/SIM mode(m/z62,62) which is headspace analysis equipment.

In order to measure a latex color, the latex, on which the stripping was completely performed, was inputted into a transparent PE bag, and thermal stability was evaluated by measuring a white index (W.I.) using an L,a,b method using an L,a,b color system.

The residual monomer contents and the latex colors measured by the experiments of Experimental Example 1 are shown in Tables 1 and 2.

TABLE 1

|  | Examples | | | | | |
| --- | --- | --- | --- | --- | --- | --- |
|  | 1 | 2 | 3 | 4 | 5 | 6 |
| Residual Monomer Content (ppm) | 8.2 | 8.9 | 7.8 | 9.1 | 8.0 | 9.3 |
| Latex Color (W.I.) | 90.3 | 90.7 | 91.1 | 91.2 | 90.2 | 90.4 |

TABLE 2

|  | Comparative Examples | | | | | | | | | | | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 |
| Residual Monomer Content (ppm) | 48.2 | 37.6 | 35.1 | 40.3 | 9.7 | 24.9 | 12.1 | 21.6 | 11.3 | 8.0 | 17.6 | 19.5 | 7.7 |
| Latex Color (W.I.) | 90.5 | 90.6 | 89.1 | 89.7 | 81.3 | 90.4 | 90.2 | 92.4 | 90.9 | 88.4 | 90.1 | 90.6 | 87.1 |

Table 1 shows the residual (unreacted) monomer contents (ppm) and the latex colors (W.I.) of Examples 1 to 6, and Table 2 shows the residual monomer contents (ppm) and the latex colors (W.I.) of Comparative Examples 1 to 13. In this case, in Table 2, the values, which indicate the low efficiency in removing the residual monomer and the deterioration in latex color, are shown with underlines.

Referring to Tables 1 and 2, it can be seen that Examples 1 to 6 have the high efficiency in removing the residual monomers because the residual monomer contents (ppm) of Examples 1 to 6 are lower than 9.3 (ppm), but Comparative Examples 1 to 4, 6 to 9, 11, and 12 have the low efficiency in removing the residual monomer because the residual monomer contents (ppm) of Comparative Examples 1 to 4 are 35 (ppm) or more and the residual monomer contents (ppm) of Comparative Examples 6 to 9, 11, and 12 are 11.3 (ppm) or more.

In addition, referring to Tables 1 and 2, it can be seen that Examples 1 to 6 have excellent thermal stability because the latex colors (W.I.) of Examples 1 to 6 are 90 or more, but Comparative Examples 5, 10, and 13 are lower in thermal stability than Examples 1 to 6 because the latex colors (W.I.) of Comparative Examples 5, 10, and 13 are 88.4 or less.

In more detail, referring to Tables 1 and 2, it can be seen that the residual monomer content is significantly as high as 35.1 (ppm) or more when the stripping is performed together with the agitation at a temperature raised by the jacket, like Comparative Examples 1 to 4. In this case, it can be seen that the efficiency in removing the residual monomer is poor even though the RPM is increased to 70 rpm like Comparative Example 2, the temperature is raised to 90° C. like Comparative Example 3, or the operation is performed for a long time, i.e., 40 minutes like Comparative Example 4. Further, there is a problem in that a large amount of foam is generated due to latex properties when the stripping is performed together with the agitation at a temperature raised by the jacket, like Comparative Examples 1 to 4.

It can be seen that in the case in which the steam is used like Comparative Example 5, the latex color is as poor as 81.3. In addition, in a case in which the steam is used like Comparative Example 5, there is a problem in that the latex is attached to a high-temperature portion and changed in color while adhering to the high-temperature portion.

It can be seen that in a case in which no ultrasonic wave is used like Comparative Example 6, the residual monomer content is 24.9, and the efficiency in removing the residual monomer is significantly low.

It can be seen that in a case in which the ultrasonic wave with a low frequency of 50 kHz is generated like Comparative Example 7, the residual monomer content is 12.1, and the efficiency in removing the residual monomer is low.

It can be seen that in a case in which no temperature adjusting part is used like Comparative Example 8, the residual monomer content is 21.6, and the efficiency in removing the residual monomer is low.

It can be seen that in a case in which the temperature of the latex is set to a low temperature of 70° C. like Comparative Example 9, the residual monomer content is 11.3, and the efficiency in removing the residual monomer is low.

It can be seen that in a case in which the temperature of the latex is set to a high temperature of 90° C. like Comparative Example 10, the latex color is as poor as 88.4.

It can be seen that in a case in which the partition part is removed like Comparative Example 11, the residual monomer content is 17.6, and the efficiency in removing the residual monomer is low.

It can be seen that in a case in which the residence time of the latex is very as short as 10 minutes like Comparative Example 12, the residual monomer content is 19.5, and the efficiency in removing the residual monomer is low.

It can be seen that in a case in which the residence time of the latex is very as long as 30 minutes like Comparative Example 13, the color of the latex is as poor as 87.1.

As a result, it can be seen that Examples 1 to 6 have high efficiency in removing the residual monomer and excellent in thermal stability in comparison with Comparative Examples 1 to 13.

While the present invention has been described with reference to the specific embodiments, the specific embodiments are only for specifically explaining the present invention, and the post-processing apparatus according to the present disclosure is not limited to the specific embodiments. The present invention may be variously carried out by those skilled in the art without departing from the technical spirit of the present invention.

In addition, the specific protection scope of the present invention will be defined by the appended claims.

Explanation of Reference Numerals and Symbols

100: Post-processing apparatus
110: Receiving tank
111: Receiving part
112: Inlet port
113: Discharge port
114: Bottom surface
120: Ultrasonic wave generating device
130: Pressure reducing part
131: Pressure reducing line
132: Vacuum pump
140: Partition part
141: Lower partition
142: Upper partition
150: Temperature adjusting part
160: Level indicator
161: Liquid level measuring sensor
171: Discharge line
172: Discharge valve
173: Discharge pump
180: Control part
191: Inlet line
192: Inlet pump
L: latex
F: Foam breaker part

The invention claimed is:

1. A system comprising:
a source of a latex containing an unreacted monomer; and
a post-processing apparatus fluidly connected to the source of latex and configured to receive the latex and reduce a content of the unreacted monomer in the latex,
wherein the post-processing apparatus comprising:
a receiving tank having therein: a receiving part; an inlet port through which the latex is introduced into the receiving part; and a discharge port through which the latex is discharged;
an ultrasonic wave generating device configured to generate ultrasonic waves to the latex accommodated in the receiving tank;
a pressure reducing part configured to reduce a pressure of the receiving part of the receiving tank to discharge the unreacted monomer to outside of the receiving tank;

a partition part provided in the receiving part of the receiving tank and comprising a plurality of partitions disposed in a direction from the inlet port toward the discharge port of the receiving tank; and temperature adjusting parts positioned in the receiving part of the receiving tank and configured to adjust a temperature of the latex accommodated in the receiving part, wherein the latex accommodated in the receiving part moves along upper and lower sides of the plurality of partitions, wherein the plurality of partition comprise:

lower partitions fixed to a bottom surface of the receiving tank; and upper partitions positioned to be spaced apart upward from the bottom surface of the receiving tank at a predetermined interval, and wherein each of the temperature adjusting parts is disposed between the lower partitions and the upper partitions in a movement direction of the latex, except for one of the temperature adjusting parts which is closest to the inlet port and one of the temperature adjusting parts which is closest to the discharge port.

2. The system of claim 1, wherein the latex accommodated in the receiving part moves along upper sides of the lower partitions and lower sides of the upper partitions.

3. The system of claim 2, wherein the lower partitions and the upper partitions are disposed alternately in a direction from the inlet port toward the discharge port of the receiving tank.

4. The system of claim 1, wherein the pressure reducing part comprises:

a pressure reducing line connected to an upper side of the receiving tank; and a vacuum pump provided in the pressure reducing line, wherein the pressure reducing part reduces a pressure of the receiving part of the receiving tank by the vacuum pump and removes and discharges the unreacted monomer, which is evaporated and separated from the latex by the ultrasonic wave generating device, to the outside of the receiving tank through the pressure reducing line.

5. The system of claim 1, further comprising:

a foam breaker part positioned at an upper side of the receiving tank and configured to spray a foam removing substance to remove foam generated by a flow of the latex in the receiving part.

6. The system of claim 1, wherein the ultrasonic wave generating device is provided at a lower side of the receiving tank and generates the ultrasonic waves to the latex accommodated in the receiving tank.

7. The system of claim 1, wherein the temperature adjusting parts maintain the temperature of the latex accommodated in the receiving part to 73 to 87° C.

8. The system of claim 1, wherein the temperature adjusting parts maintain the temperature of the latex accommodated in the receiving part to 75 to 85° C.

9. The system of claim 1, wherein the ultrasonic wave generating device generates the ultrasonic waves with 75 to 1,500 kHz.

10. The system of claim 1, wherein the ultrasonic wave generating device generates the ultrasonic waves with 100 to 1,000 kHz.

11. The system of claim 1, further comprising:

a discharge valve provided at a side of the discharge port of the receiving tank, wherein the discharge valve adjusts a residence time of the latex in the receiving tank.

12. The system of claim 11, further comprising:

a level indicator configured to measure a height level of the latex in the receiving tank, wherein the residence time of the latex in the receiving tank is adjusted by adjusting the discharge valve based on the height level of the latex measured by the level indicator.

13. The system of claim 12, further comprising:

a control part configured to adjust an opening degree of the discharge valve by being supplied with a measured value of the latex from the level indicator.

14. The system of claim 13, wherein the control part maintains the residence time of the latex in the receiving tank as 13 to 32 minutes.

15. The system of claim 13, wherein the control part maintains the residence time of the latex in the receiving tank as 15 to 25 minutes.

16. The system of claim 11, further comprising:

a discharge line connected to the discharge valve; and a discharge pump provided in the discharge line.

17. The system of claim 1, wherein the temperature adjusting parts are heaters.

18. The system of claim 1, wherein the temperature adjusting parts are placed along with the movement of the latex accommodated in the receiving part.

19. The system of claim 1, wherein the temperature adjusting parts are placed parallel to the partition part.

* * * * *